(12) United States Patent
Passade-Boupat et al.

(10) Patent No.: US 8,469,118 B2
(45) Date of Patent: Jun. 25, 2013

(54) DRILLING FLUID CONTAINING CARBON NANOTUBES

(75) Inventors: Nicolas Passade-Boupat, Pau (FR); Cathy Rey, Labatut (FR); Mathieu Naegel, Strasbourg (FR)

(73) Assignees: Arkema France, Colombes (FR); Total SA, Courbevoie (FR)

( * ) Notice: Subject to any disclaimer, the term of this patent is extended or adjusted under 35 U.S.C. 154(b) by 374 days.

(21) Appl. No.: 12/676,814

(22) PCT Filed: Aug. 29, 2008

(86) PCT No.: PCT/FR2008/051546
§ 371 (c)(1),
(2), (4) Date: Mar. 5, 2010

(87) PCT Pub. No.: WO2009/030868
PCT Pub. Date: Mar. 12, 2009

(65) Prior Publication Data
US 2010/0300759 A1  Dec. 2, 2010

(30) Foreign Application Priority Data
Sep. 7, 2007 (FR) ..................................... 07 06274

(51) Int. Cl.
*E21B 7/18* (2006.01)
*C09K 8/02* (2006.01)

(52) U.S. Cl.
USPC .................. 175/65; 175/64; 175/72; 507/103

(58) Field of Classification Search
USPC ................................ 175/65, 64, 72; 507/103
See application file for complete search history.

(56) References Cited

U.S. PATENT DOCUMENTS

| 4,532,052 A * | 7/1985 | Weaver et al. ................ 507/222 |
| 4,735,733 A | 4/1988 | Blumenthal et al. |
| 6,770,603 B1 * | 8/2004 | Sawdon et al. ............... 507/140 |
| 7,972,555 B2 * | 7/2011 | Polizzotti et al. ............ 264/572 |
| 2006/0046937 A1 * | 3/2006 | Fu et al. ........................ 507/131 |
| 2007/0181302 A1 * | 8/2007 | Bicerano .................... 166/280.2 |
| 2008/0135242 A1 * | 6/2008 | Lesko et al. .................. 166/268 |
| 2011/0067864 A1 * | 3/2011 | Reddy et al. ................. 166/285 |

FOREIGN PATENT DOCUMENTS
EP   1 634 938 A1   3/2006

OTHER PUBLICATIONS
International Search Report of PCT/FR2008/051546 (Mar. 4, 2009).

\* cited by examiner

*Primary Examiner* — Zakiya W Bates
*Assistant Examiner* — Silvana Runyan
(74) *Attorney, Agent, or Firm* — Millen, White, Zelano & Branigan, P.C.

(57) ABSTRACT

A viscoelastic drilling fluid for drilling in underground rock formations, comprising
(a) an aqueous and/or organic liquid base,
(b) at least one weighting agent, in particulate form, with a mass per unit volume of at least 2 g/cm$^3$, preferably at least 4 g/cm$^3$, in suspension in said liquid base, and
(c) carbon nanotubes with a mean diameter of between 10 and 30 nm and a specific surface in excess of 200 m$^2$/g, preferably of between 200 m$^2$/g and 250 m$^2$/g and a drilling method using such a fluid.

22 Claims, 1 Drawing Sheet

DRILLING FLUID CONTAINING CARBON NANOTUBES

The present invention relates to a water-based or organic-based viscoelastic fluid intended for drilling in underground formations, and containing carbon nanotubes.

Drilling fluids, also known as drilling muds, are complex fluids used for drilling oil wells. They are injected, usually continuously, in the bore hole via the drill rod string. Their multiple functions include, for example, transporting rocky spoil to the surface, keeping the bore hole at a high enough hydrostatic pressure that the rock formation being drilled does not collapse, or lubricating and cooling the drill head. There are two main families of drilling mud: oil-based muds (generally reverse emulsions of brine in an oily phase) and water-based muds.

Maintaining enough hydrostatic pressure to compensate for the lateral thrust of the rock formation through which the bore hole is drilled entails progressively increasing the density of the drilling fluid as the bore hole advances toward deep regions. This increase in the density is obtained by adding what is known in English as weighting agents, that is to say finely ground solid materials, of great density and which are not soluble in the drilling fluid. The greater the depth of the well, the more the amount and/or the density of the weighting agent used increase(s), and the more effective the system that keeps the weighting agent in suspension in the drilling fluid has to be.

This is because sedimentation of the weighting agent, for example when injection of mud is temporarily halted, may have disastrous consequences such as plugging the well or locally decreasing the hydrostatic pressure of the fluid column, causing the well to collapse.

The weighting agent is typically kept in suspension by viscosity agents conventionally chosen from organophilic or non-organophilic clays and organic polymers soluble in the drilling fluid. Now, beyond a certain filling depth, where the system for keeping the weighting agent in suspension has to be particularly effective, organic polymers suffer degradation due to the high temperatures found at these depths and become partially or completely ineffective.

The problem of the thermal degradation of organic polymers cannot be solved by replacing them with clays either because while the clays conventionally used as thickening agents (bentonite, montmorillonite, attapulgite and organophilic clays) are admittedly capable of withstanding markedly higher temperatures than organic polymers, the amount of clay needed to keep substantial quantities of highly dense weighting agent in suspension when drilling at great depths is considerable. The drilling muds then have an excessively high solid content, presenting problems of keeping the mud circulating because of the excessively high viscosity.

The systems currently used, whether based on polymers or on clays, are unfortunately unable to keep the weighting agent in suspension at temperatures in excess of about 250° C.

As part of its research aimed at developing new drilling fluids that can be used under high-temperature and high-pressure conditions, the Applicant Company has discovered that certain carbon nanotubes, when used in relatively small quantities, form excellent thickening agents which, at the same time, have excellent stability when hot and are capable of keeping significant quantities of highly dense weighting agent, such as barite or calcite, in suspension without at the same time making the drilling fluid excessively viscous.

The benefit of the drilling fluids of the present invention, which contain carbon nanotubes, lies in particular in their particular viscoplastic behavior characterized by a high yield value or yield stress combined with a relatively modest viscosity. The yield stress, determined using the Herschel-Bulkley model (Hemphill T., Campos W., and Pilehvari A.: "Yield-power Law Model More Accurately Predicts Mud Rheology", Oil & Gas Journal 91, No. 34, Aug. 23, 1993, pages 45-50), is the shear stress below which the behavior of the fluid is substantially that of a solid (infinite viscosity) and above which the fluid exhibits thixotropic behavior.

The value of the yield stress, in the Herschel-Bulkley model, provides information as to the ability of the fluid to keep particles of a dense solid in suspension in a viscoplastic fluid at rest. The higher this yield stress, the more the fluid opposes sedimentation of the suspended particles. The special carbon nanotubes used in the present invention, which are characterized by a relatively small (less than 30 nm) mean diameter and a large (greater than 200 $m^2/g$) specific surface, give the water-based or oil-based drilling fluids a considerably higher yield stress than can be conferred upon them by an equivalent content of organic polymers.

Furthermore, these carbon nanotubes are thermally stable at temperatures ranging as high as 325° C. or even higher.

The use of carbon nanotubes in very small amounts, preferably less than 3 wt %, does not introduce the problems of excessive viscosity described hereinabove in the case of thickening clays, thus making the fluids containing them easier to pump and able to flow better.

The carbon nanotubes described in greater detail hereinafter thus advantageously completely or partly replace the thickening agents of the organic polymer, clay or fatty acid type used in drilling fluids, particularly under high-pressure and high-temperature conditions.

The use of nanotubes in aqueous viscoelastic fluids for oil exploration has already been proposed in European application EP 1 634 938. That document relates first and foremost to fracturing fluids thickened by a combination of a system of surfactants, electrolytes and nanotubes, the latter serving chiefly to enhance the thickening ability of the surfactants. These fracturing fluids also contain propping agents, for example sand, nutshell particles, bauxite, glass beads or ceramic beads. The propping agents carried by the fluids are intended to be deposited in the underground formations. The intent there is not, as it is in the present invention, to keep highly dense particles in suspension at any cost, but rather to deposit them at particular locations in the rock formation. Furthermore, that document does not at any point envision the use of nanotubes as the only agents used to thicken the fluid.

The use of carbon nanotubes to keep dense particles, such as weighting agents, in suspension, is described in U.S. Pat. No. 4,735,733. The nanotubes used in that document have a specific surface of less than 190 $m^2/g$ because a study into the influence of nanotube specific surface on the rheological behavior of thickened fluids had shown that nanotubes with a specific surface greater than that value had an inadequate thickening effect in a mineral oil (see FIG. 4, and the comments relating to FIG. 7, from column 16, line 66 onward). Going against the teachings of that prior art document that recommends the use of nanotubes with a small specific surface, the Applicant Company on the other hand has found that nanotubes with a specific surface greater than or equal to 200 $m^2/g$ confer upon the fluids containing them a rheological behavior that is particularly advantageous allowing weighting agents to be kept in suspension in a drilling fluid at rest.

One subject of the present invention is therefore a viscoelastic drilling fluid for drilling in underground rock formations, comprising (a) an aqueous and/or organic liquid base, (b) at least one weighting agent, in particulate form, with a mass per unit volume of at least 2 g/cm$^3$, preferably at least 4 g/cm$^3$, in suspension in said liquid base, and (c) carbon nanotubes with a mean diameter of between and 30 nm and a specific surface of between 200 and 250 m$^2$/g.

The liquid base used in the drilling fluids of the present invention may, in theory, be any base conventionally used in drilling fluids. It may, for example, be an aqueous base, this being particularly advantageous for economic and ecological reasons. These aqueous bases as is known contain water-soluble salts intended mainly to increase the density of the base. The preferred salts comprise halides and formates of sodium, of potassium, of calcium, of zinc, and of cesium, and combinations thereof. By way of particularly preferred salts, mention may be made of calcium chloride, calcium bromide, potassium formate, cesium/potassium formate, and combinations thereof. These aqueous bases may further contain small fractions of water-miscible and/or water-immiscible organic solvents.

In some cases, it may, however, be beneficial, or even necessary, to limit the water content of the drilling fluids, for example when the well passes through rock formations that contain a significant fraction of water-soluble or water-dispersible components liable to be carried away by the fluid. The liquid base is then either an oil or, alternatively, a water-in-oil emulsion preferably containing at most 50 wt %, and in particular at most 20 wt % water.

When the aqueous base is a water-in-oil emulsion such as this, also known as a reverse emulsion, the viscoelastic fluid further contains at least one surfactant capable of stabilizing the emulsion.

Surfactants capable of stabilizing a reverse emulsion generally have a hydrophile-lipophile balance (HLB) of less than 7. The quantity of surfactant that is enough to stabilize the water-in-oil emulsion does, of course, depend on the respective proportions of the aqueous and oily phases, but generally ranges between 1 wt % and 5 wt %. The surfactant or surfactants are preferably chosen from nonionic and anionic surfactants. Document US2006-0046937 describes surfactants that can be used in formulating the drilling muds of the present invention.

The oil used in the drilling fluids of the present invention, that is to say the oil that forms the liquid base or alternatively the oil that forms the continuous phase of the water-in-oil emulsion or the discontinuous phase of an oil-in-water emulsion, is preferably a mineral oil, a fluorinated oil, a diesel oil or a synthetic oil, preferably a mineral oil or a synthetic oil. Apolar oils are generally preferred over polar oils. One oil conventionally used is, for example, the commercial product EDC 99-DW, a polar oil, marketed by Total®.

In theory, any particulate solid with a density higher than that of the liquid base, preferably with a mass per unit volume of at least 2 g/cm$^3$ and, when drilling at great depths, preferably a mass per unit volume of greater than 3 g/cm$^3$ or even greater than 4 g/cm$^3$ can be used as a weighting agent. These weighting agents are known and are chosen for example from barite (BaSO$_4$), calcite (CaCO$_3$), dolomite (CaCO$_3$.MgCO$_3$), hematite (Fe$_2$O$_3$), magnetite (Fe$_3$O$_4$), ilmenite (FeTiO$_3$) and siderite (FeCO$_3$). The weighting agent used as a particular preference is barite.

The quantity of weighting agent depends essentially on the density that the drilling fluid is to be given. This density, and therefore the quantity of weighting agent used, generally increases progressively with the depth of the bore hole. The drilling fluids of the present invention are preferably intended for deep drilling and therefore have a relatively high density, preferably an overall density of at least 1.5, preferably in excess of 2.5. The upper limit on weighting agent content is essentially determined by the problems with viscosity caused by an excessive solid content. In general, the weighting agent is used in the drilling fluids of the present invention at a concentration of between 10 and 70 wt %. The percentage of weighting agent used can vary widely according to the desired density.

The carbon nanotubes (or NTCs) used in the present invention are known. They are special crystalline structures of hollow closed tubular shapes made up of carbon atoms arranged uniformly in pentagons, hexagons and/or heptagons. The NTCs consist of one or more graphene(s) rolled up. Thus a distinction is made between single wall nanotubes (SWNTs) and multiwall nanotubes (MWNTs).

As indicated above, the NTCs used in the present invention have a mean diameter ranging from 10 to 30 nm, preferably 10 to 15 nm. Their mean length advantageously ranges between 0.1 and 10 μm and the mean length/mean diameter ratio is advantageously higher than 10 and usually higher than 100.

The specific surface of the NTCs used in the present invention, as determined by nitrogen adsorption, using the BET method, is greater than 200 m$^2$/g and preferably between 200 m$^2$/g and 250 m$^2$/g. Their apparent density in the uncompacted state, or bulk density, preferably ranges between 0.03 and 0.5 g/cm$^3$ and particularly between 0.05 and 0.2 g/cm$^3$. This bulk density is the ratio of a given mass of carbon nanotubes with respect to the volume of this same mass measured after a test specimen containing said nanotubes has been inverted three times in succession.

The multiwall carbon nanotubes may, for example, comprise 5 to 15 graphenes and more preferably 7 to 10 graphenes.

The carbon nanotubes with small mean diameter and large specific surface as used in the present invention are prepared using the synthesis methods described in international application WO2006/082325.

Raw carbon nanotubes, that is to say carbon nanotubes that have not been chemically modified, exhibiting the above technical characteristics are available on the market from ARKEMA, under the trade name GRAPHISTRENGTH® C100, high-strength, multi-wall carbon nanotubes. This product consists of nanotubes having, on average, 5 to 15 graphenes and having a mean diameter of between 10 and 15 nm and a mean length of 0.1 to 10 μm.

These nanotubes can be purified and/or oxidized and/or ground before they are incorporated into the drilling fluids of the present invention.

The NTCs may be ground hot or cold, in equipment such as ball mills, hammer mills, pug mills, cutting mills, fluid energy mills or any other grinding system capable of reducing the size of the entangled mass of NTCs. It is preferable for this grinding step to be performed using a fluid energy mill technique, particularly in a mill in which air is used as the fluid.

The raw or ground NTCs may be purified by washing them in a solution of sulfuric acid, so as to rid them of any residual inorganic and metallic impurities resulting from the method by which they were prepared. The NTC/sulfuric acid weight ratio used for this washing may range between 1:2 and 1:3. The purification operation may also be performed at a temperature ranging from 90 to 120° C., for example for a period lasting 5 to 10 hours. This operation may advantageously be followed by steps in which the purified NTCs are rinsed in water and dried.

Oxidation of the raw, ground and/or purified NTCs is advantageously performed by bringing the nanotubes into contact with a sodium hypochlorite solution, for example in an NTC/sodium hypochlorite weight ratio ranging from 1:0.1 to 1:1, preferably at room temperature. This oxidation operation is advantageously followed by steps in which the oxidized NTCs are filtered and/or centrifuged, washed and dried.

The NTCs used in the present invention may be chemically modified by introducing functional groups via covalent bonds. These functional groups, such as sulfate, sulfonate, carboxy, benzenesulfonate and amine (optionally quaternized) groups or alternatively groups obtained by polymerizing monomers at the surface of the NTCs, generally improve the dispersibility of the nanotubes in water or organic solvents.

In the present invention, use will preferably be made of unmodified NTCs for drilling fluids based on oil or based on a reverse emulsion. For drilling fluids that are water based, use will preferably be made of nanotubes that have been functionalized with ionic organic groups.

The quantity of NTC used in the drilling fluids of the present invention depends, amongst other things, on the quantity and density of weighting agent used, on the drilling depth, on the nature of the liquid base, and on whether or not there are any other thickening agents in the drilling fluid.

This quantity preferably ranges between 0.1 and 3 wt %, with respect to the total weight of drilling fluid.

In one particular embodiment of the present invention, the NTCs are the only thickening agent, that is to say that the drilling fluid is essentially free of any other known thickening agent such as organic polymers, fatty acids, clays or thickening systems based on surfactants and electrolytes like those described in EP 1 634 938. The concentration of NTCs in the drilling fluid is then relatively high, preferably ranging between 1 and 3 wt %, and particularly between 1.5 and 3% of NTC. This is because experiments have shown that when no other thickening agents are present, the yield stress of the drilling fluids increases spectacularly above a minimum of around 1 wt % of NTC.

Carbon nanotubes are also of use in enhancing the effect of conventional thickening systems, for example of polymer-based thickening systems. In another embodiment of the present invention, the drilling fluids of the present invention thus also contain one or more organic polymer(s) soluble in the aqueous phase and/or in the oily phase of the liquid base. The NTC concentration is then preferably between 0.1 and 1 wt % of carbon nanotubes.

These thickening organic polymers are chosen from those conventionally used in drilling fluids and, by way of example, mention may be made of guar gum, hydroxy-propylguar, carboxymethylguar, hydroxypropylcellulose, hydroxyethylcellulose, xanthan, starch, polyacrylates, and poly(diallyldimethylammonium chloride).

The subject of the present invention is not only drilling fluids containing carbon nanotubes like those defined hereinabove but also a method of drilling in underground rock formations using such drilling fluids.

A further subject of the invention is a method of drilling in underground rock formations involving injecting a drilling fluid that contains an aqueous and/or organic liquid base and carbon nanotubes with a mean diameter ranging from 10 to 30 nm, the carbon nanotube content of the drilling fluid being increased as the drilling depth, the drilling temperature and/or the drilling pressure increase(s). In this drilling method, at least one weighting agent and/or at least one thickening agent other than the carbon nanotubes is/are preferably introduced into the drilling fluid.

Thanks to the excellent ability of the NTCs used in the drilling fluids of the present invention to withstand heat, these NTCs are particularly well suited to drilling at great depth, that is to say under high-temperature and high-pressure conditions.

In a preferred embodiment of the drilling methods of the present invention, the drilling temperature is therefore greater than or equal to 200° C., and in particular greater than 250° C.

High-temperature and high-pressure drilling is, however, just one preferred embodiment of the method of the invention, and the drilling fluids of the present invention, thanks to their high yield stress combined with a relatively low viscosity, also prove very useful even in shallow or medium depth drilling.

It is thus possible to use the drilling fluids of the present invention throughout the drilling by progressively increasing the carbon nanotube content as the drilling depth, the drilling temperature and/or the drilling pressure increase(s). A method such as this can be singled out for its great simplicity due to the possibility of continuously recirculating the drilling fluid, which can be re-used once the spoil has been removed and additional quantities of weighting agent and carbon nanotubes have been added.

In one particular embodiment of the drilling method of the present invention, the drilling fluid preferably contains no thickening agent other than the carbon nanotubes.

In another embodiment, the drilling method of the present invention involves progressively replacing one or more thickening agents present in the fluid chosen, for example, from clays (bentonite, montmorillonite, attapulgite, organophilic clays) or organic polymers, with carbon nanotubes (c) as the drilling depth, the drilling temperature and/or the drilling pressure increase(s). It may in fact be advantageous, mainly for reasons associated with the cost of producing the drilling fluids, to use known and inexpensive thickening agents such as organic polymers and/or thickening clays at the start of drilling, and to introduce the NTCs only from a certain depth onward when the thermal degradation of the organic polymers or the excessive solid-matter content introduced by the clays begins to present the problems described in the introductory part.

A final subject of the invention is the use of carbon nanotubes with a mean diameter of between 10 and 30 nm and a specific surface greater than 200 $m^2/g$ for drilling underground formations.

The present invention will be better understood in the light of the following example, given for illustrative purposes only, and which is not intended to restrict the scope of the invention as defined by the attached claims.

EXAMPLE

An evaluation was made of the rheological characteristics and of the effect on placing barite in suspension in an oil-based drilling mud with a density of 1.7 $g/cm^3$ and containing 56 wt % of barite, hereinafter known as "Victoria Mud", with and without the addition of 1 wt % of carbon nanotubes (NTC hereinafter) with respect to the weight of oil contained in the mud.

Precise measurements were made of the viscosity at 50° C., under 170 $s^{-1}$ of shear, of the muds tested, which had been subjected to dynamic aging for 16 h or 40 h at 180° C., and then to a static subsidence test at 205° C. for 60 h or 120 h.

The term "subsidence" means the phenomenon whereby particles of weighting agent produce an avalanche effect generally seen on angled bore holes, leading to an over-concentration of weighting agent in the bottom part of the hole and to an underconcentration in the top part of the hole due to a sedimentation effect. The subsidence test performed consisted in measuring the density D1 of the mud sample in its bottom part, after the sample had been held at a given temperature, in a cell inclined at 45°, for a certain period of time, and deducing the subsidence index IS using the following formula: $IS=D1/2 \times Do$ where Do denotes the initial density of the sample.

Figure 1:
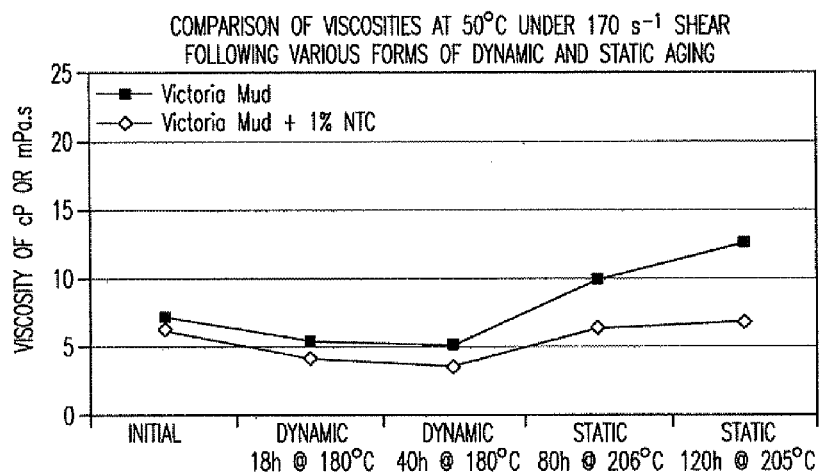
FIGS. 1-2 represent a comparison of drilling mud viscosities and sag factors with and without carbon nanotubes.
Figure 2:
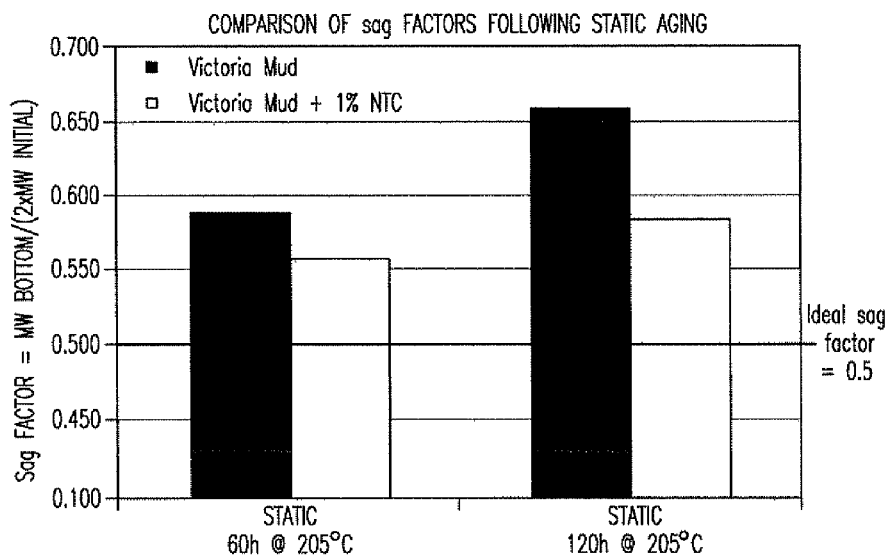

The results of this test are illustrated in the attached FIGS. 1 and 2.

As can be seen from FIG. 1, the addition of NTCs results in a general improvement in the rheology of the samples. FIG. 2 also shows that adding NTCs makes it easier to prevent subsidence of the barite, the subsidence index (or "sag factor") being 0.56 as opposed to 0.59 after 60 h, and 0.58 as opposed to 0.66 after 120 h.

This example shows that NTCs can be used as viscosity-increasing agents at high temperatures for oil-based muds. It is also possible to envision using them to keep the conventional weighting agents used in drilling muds in suspension.

The invention claimed is:

1. A viscoelastic drilling fluid for drilling in underground rock formations, comprising
    (a) an aqueous and/or organic liquid base,
    (b) at least one weighting agent, in particulate form, with a mass per unit volume of at least 2 g/cm³, in suspension in said liquid base, and
    (c) carbon nanotubes with a mean diameter of between 10 and 30 nm and a specific surface in excess of 200 m²/g.

2. The viscoelastic fluid according to claim 1, wherein it contains 0.1 to 3 wt % of carbon nanotubes.

3. The viscoelastic fluid according to claim 1, wherein the aqueous phase of the liquid base contains at least one water-soluble salt.

4. The viscoelastic fluid according to claim 1, having a density of at least 1.5.

5. A method of drilling in underground rock formations comprising injecting into said formation a drilling fluid according to claim 1.

6. The viscoelastic fluid according to claim 1, wherein the liquid base is a base with an oily continuous phase containing at most 50 wt % water.

7. The viscoelastic fluid according to claim 6, wherein the oily continuous phase that forms the liquid base is a mineral oil, a fluorinated oil, a diesel oil or a synthetic oil.

8. The viscoelastic fluid according to claim 1, wherein the liquid base is a water-in-oil emulsion and the viscoelastic fluid further contains at least one surfactant.

9. The viscoelastic fluid according to claim 8, wherein the surfactant is an anionic or nonionic surfactant.

10. The viscoelastic fluid according to claim 1, wherein the weighting agent is barite ($BaSO_4$), calcite ($CaCO_3$), dolomite ($CaCO_3 \cdot MgCO_3$), hematite ($Fe_2O_3$), magnetite ($Fe_3O_4$), ilmenite ($FeTiO_3$), siderite ($FeCO_3$), or mixtures thereof.

11. The viscoelastic fluid according to claim 10, wherein the weighting agent is barite.

12. The viscoelastic fluid according to claim 1, further containing at least one thickening agent that is an organic polymer soluble in the aqueous phase of the liquid base, in the oily phase of the liquid base or in both phases of the liquid base.

13. The viscoelastic fluid according to claim 12, wherein it contains 0.1 to 1 wt % of carbon nanotubes.

14. The viscoelastic fluid according to claim 1, that is free of organic polymers that are soluble in the aqueous phase of the liquid base, in the oily phase of the liquid base or in both phases of the liquid base.

15. The viscoelastic fluid according to claim 14, wherein it contains 1 to 3 wt % of carbon nanotubes.

16. The drilling method according to claim 5, comprising progressively replacing one or more thickening agents present in the fluid with carbon nanotubes as the drilling depth, the drilling temperature or both the drilling depth and the drilling pressure increase(s).

17. The drilling method according to claim 5, wherein the drilling temperature is greater than or equal to 200° C.

18. The drilling method according to claim 5, wherein the drilling fluid contains no thickening agent other than the carbon nanotubes.

19. A method of drilling in underground rock formations comprising injecting into said formation a drilling fluid that contains an aqueous liquid base, an organic liquid base or both aqueous and organic liquid bases, and carbon nanotubes with a mean diameter ranging from 10 to 30 nm, and a specific surface in excess of 200m²/g, the carbon nanotube content of the drilling fluid being increased as the drilling depth, the drilling temperature or both the drilling depth and the drilling pressure increase(s).

20. The drilling method according to claim 19, wherein at least one weighting agent, at least one thickening agent other than the carbon nanotubes, or both a weighting agent and said thickening agent are introduced into the drilling fluid.

21. A method for drilling underground fat mations comprising injecting a drilling fluid that contains carbon nanotubes with a mean diameter of between 10 and 30 nm and a specific surface greater than 200 m²/g.

22. A viscoelastic drilling fluid for drilling in underground rock formations, comprising
    (a) an aqueous liquid base, an organic liquid base, or an aqueous and organic liquid base,
    (b) at least one weighting agent, in particulate form, with a mass per unit volume of at least 2 g/cm³, in suspension in said liquid base, and
    (c) carbon nanotubes with a mean diameter of between 10 and 30 nm and a specific surface in excess of 200 m²/g, wherein the carbon nanotubes are the only thickening agent in the fluid.

* * * * *

UNITED STATES PATENT AND TRADEMARK OFFICE
CERTIFICATE OF CORRECTION

PATENT NO. : 8,469,118 B2
APPLICATION NO. : 12/676814
DATED : June 25, 2013
INVENTOR(S) : Nicolas Passade-Boupat et al.

It is certified that error appears in the above-identified patent and that said Letters Patent is hereby corrected as shown below:

In the Claims

Column 8, Line 41 reads: "21. A method for drilling underground fat mations com-" should read
-- 21. A method for drilling underground formations com- --.

Signed and Sealed this
Fifteenth Day of October, 2013

Teresa Stanek Rea
*Deputy Director of the United States Patent and Trademark Office*